United States Patent [19] [11] Patent Number: 4,499,921
Stoll [45] Date of Patent: Feb. 19, 1985

[54] THREE-WAY AIR VALVE

[76] Inventor: Kurt Stoll, Lenzhalde 72, D-7300 Esslingen a.N., Fed. Rep. of Germany

[21] Appl. No.: 327,646

[22] Filed: Dec. 4, 1981

[30] Foreign Application Priority Data

Dec. 24, 1980 [DE] Fed. Rep. of Germany ....... 3049110

[51] Int. Cl.³ ............................................. F16K 11/10
[52] U.S. Cl. .............................. 137/627.5; 137/454.2; 137/596.1; 137/214; 137/269
[58] Field of Search ..................... 137/269, 271, 627.5, 137/454.2, 596.1, 596.2; 251/214

[56] References Cited

U.S. PATENT DOCUMENTS

| 2,393,805 | 1/1946 | Parker | 137/596.2 |
| 3,086,749 | 4/1963 | Frye | 251/214 X |
| 3,247,767 | 4/1966 | Aslan | 251/214 X |
| 3,399,932 | 9/1968 | Alfieri et al. | 137/627.5 |
| 3,507,545 | 4/1970 | Page et al. | 137/627.5 |
| 3,515,371 | 6/1970 | King et al. | 251/214 |
| 3,578,024 | 5/1971 | Hill | 137/627.5 |
| 3,927,916 | 12/1975 | Masuda | 137/627.5 X |
| 3,977,425 | 8/1976 | Hayashida | 137/627.5 X |
| 4,220,174 | 9/1980 | Spitz | 137/271 |
| 4,265,457 | 5/1981 | Lambie | 251/214 X |

FOREIGN PATENT DOCUMENTS

| 2200915 | 7/1972 | Fed. Rep. of Germany | 137/627.5 |
| 1244776 | 2/1959 | France | 137/627.5 |
| 368205 | 5/1963 | Switzerland | 137/627.5 |

Primary Examiner—Larry Jones
Assistant Examiner—Carl D. Price
Attorney, Agent, or Firm—Flynn, Thiel, Boutell & Tanis

[57] ABSTRACT

A three-way air valve whose housing has connection openings for a compressed air power line, a line running to the load and an air let-off opening, the load opening being joined up with the power opening in one position of the valve and with the air let-off opening in the other position thereof. The housing having the power inlet opening, the load opening and the air let-off opening has an axial hole running through it from end to end for taking up a liner, which may be pushed in from one end of the housing and has airways for the air moving through the valve. Furthermore, the liner has a valve lip. Within the inner hole of the liner, which is open at the end nearest to the valve lip, there is the valve spool which has a valve seat for use with the valve lip. The valve spool is acted upon by the driving rod guided in the housing and by a spring which urges it axially.

10 Claims, 2 Drawing Figures

THREE-WAY AIR VALVE

FIELD OF THE INVENTION

The present invention relates to a three-way air valve and, more particularly, to a valve having a housing with three openings for connection with a compressed air line, a line to a load and an air let-off opening, the power inlet opening and the load opening being in communication when the valve is opened by a spool, while in the shut condition of the valve the load opening communicates with the let-off opening by the spool.

BACKGROUND OF THE INVENTION

Because known valve designs on these general lines are generally complex and are only able to be produced at a high price, one purpose of the present invention is that of designing a valve of the sort in question which may be produced and put together at a low price.

SUMMARY OF THE INVENTION

For effecting this and further purposes in the invention the design is such that the housing, having the air power inlet opening, the load opening and the let-off opening in it, has a hole running through it axially from end to end for taking up a liner which may be pushed in from one end and has airways for the air and furthermore a valve lip or face, the lining having a middle, axial hole therethrough which is open at the end next to the valve lip. The spool is guided in the hole within the liner for motion as controlled by a spring acting in one direction and a driving rod acting in the opposite direction, the spool resting against said valve lip. In this respect it is best for the hole in the housing to become narrower towards the driving rod like a cone, the liner having a coned outer face for fitting in the hole in the housing. The inner hole within the liner may, on the other hand, for example have a cylindrical form and may be shut off at its end furthest from the driving rod. A specially useful effect is produced if, for reasons having to do with producing and putting together such a valve, the liner is made up of a top part nearest the driving rod and a lower part on the opposite side of the top part, the top part and the lower part being, if desired, coaxial in relation to each other while furthermore the top part and the lower part are put together axially for producing a joint without any space within it so that the outer faces of such liner parts are not broken up by the joint and to take the form of a smooth body of revolution.

The valve produced on the footing of the present invention is such that little machining of the parts is needed and only a small number of high price machining operations are necessary; furthermore, the parts of the valve may be put together quickly without moving one's hands much. It is possible to say that not only is the valve made up of a small number of parts, that is to say the housing, the liner, the valve spool and the springs, but furthermore such inner parts may be produced in a very simple way, for example by making the housing of an aluminum pressure casting while the liners may be made of resin using known operations. The spool and the driving rod may as well be produced simply; furthermore, putting the parts together is very simple, because for example the liner with the valve spool within it may be pushed into the housing from one side thereof.

A further useful effect produced by the invention is that with only a small number of further parts—something specially to be desired from the point of view of warehousing and furthermore producing the systems—a complete range of different forms of valves may be produced and, to take an example, simply by changing the lower part of the liner, the valve may be changed from one which is normally open to one which is normally shut. Furthermore, simply by changing the air lines, the let-off opening or connection may be changed into a load opening or connection without having any other effect on the function of the valve and without it being necessary to make use of further parts or special operations. For this purpose, the design may be such that the top part of the liner has two different possible lower liner parts with which it may be assembled as desired, each of the two possible lower parts having a radial connection hole coming from the middle inner hole, the radial connection hole producing, in one case, in the resting position of the valve, a connection with the power line opening and in the other case the connection with the let-off opening. A useful effect is produced if the lower part of the liner has a cylindrical wall stretching out from a radial end wall in an axial direction and placed round the middle inner hole coaxially, the cylindrical walling off, together with the outer wall of the lower part, defining a ring-like space which, at its axial end nearest to the driver rod, is open. The design may for example be such that the top part of the liner has two different lower parts with which it may be used as desired, and in the normal resting position, in the one case, the ring-like space is joined up by a radial connection hole—the first connection hole as seen looking in an axial direction—with the compressed air line opening, and the middle inner hole in the liner is joined up by a second radial connection hole with the let-off opening. In the other case the ring-like space is joined up by way of the second connection hole with the let-off opening and, lastly, the middle hole is joined up by way of the first radial inner hole with the compressed air line opening of the valve. From this it will readily be seen that in the case of such a system, simply by using a different lower part of the liner, the valve may be changed from a normally open to a normally shut valve or vice versa. This is not only simple from the point of view of producing the separate parts, and keeps prices down, but furthermore there is a useful effect with respect to putting the parts together, because, with good effect, all the inner parts of the valve may be put in from one side or end, that is to say the end furthest from the driving rod, which is shut off in the ready-for-use condition of the valve, the parts being slipped into the hole in the housing.

BRIEF DESCRIPTION OF THE DRAWINGS

An account will now be given of two working examples of the invention.

DETAILED DESCRIPTION

Figure 1:
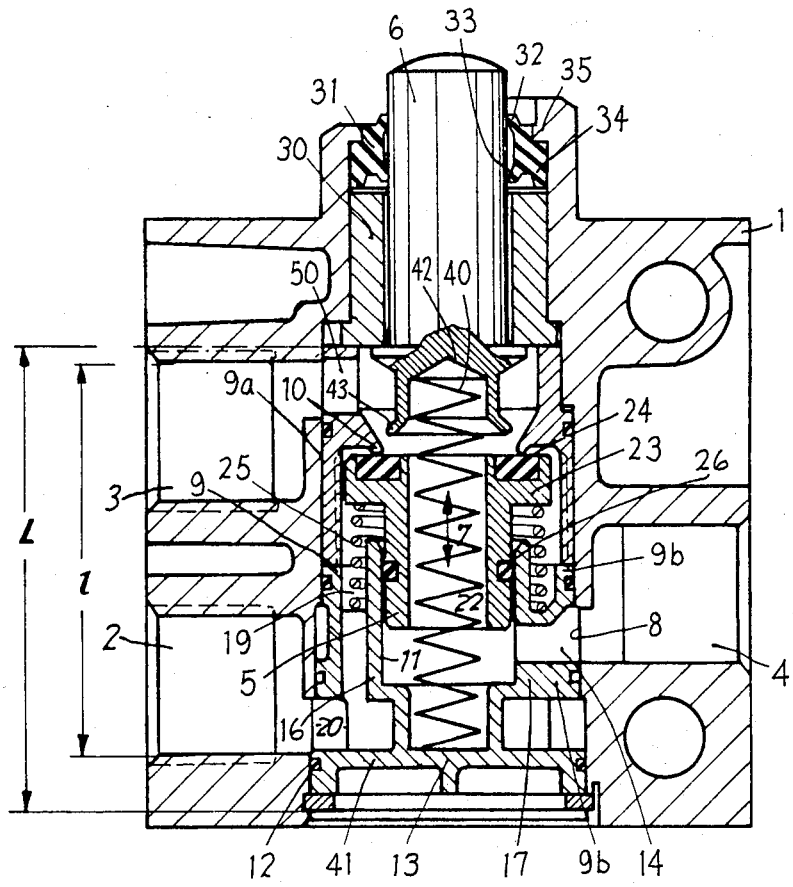
FIG. 1 is a view of a valve embodying the invention which is normally shut and in which, in the shut or resting condition, the power inlet opening is shut down and the air let-off opening is joined up with the load opening of the valve, the valve being seen from the side and, in part, in axial section.

The three-way air valve to be seen in FIG. 1 has a housing 1 with a connection opening or port 2 for joining up with a compressed air line, a connection opening or port 3 for a line going to the load, and an opening or port 4 for letting off or exhausting air. Furthermore, the valve has a closure member or spool 5 within its housing and able to be moved from a point outside the valve by way of a driving rod or ram 6, said spool moving backwards and forwards as marked by double-headed arrow 7 for producing, dependent on its position at a given time, fluid communication between power opening 2 and load opening 3 or between load opening 3 and let off opening 4. In the present working example illustrated, it is a question of a valve which is shut in the resting or normal position so that the load, communicating with opening 3, is joined up with connection opening 4 for letting off air by way of the valve. The housing 1 has an axial hole 8 going through it from side to side or end to end which receives a liner or insert 9, which may be slipped in from one end and which has airways or passageways for the air and an annular valve seat or lip 10 seating against an annular surface or seat on valve spool 5. Valve liner 9 is placed in hole 8 in the housing so that it may be taken out again; furthermore it has an annular inner wall which defines a central axial hole 11 running through it which is open at the end next to the valve lip 10. Furthermore, valve spool 5 is guided within the liner, it being acted upon by the driving rod 6 at one end and being biased by a spring, to be detailed later on, for moving it in the opposite axial direction. The valve spool, able to be moved as marked by double-headed arrow 7 backwards and forwards, comes up against valve lip 10 on liner 9 for producing a valve effect.

It is to be noted that the hole 8 in housing 1 is stepped and becomes narrower towards the driving end of driving rod 6, the liner 9 having an outer face which is stepped for fitting into the hole 8. The outer face of liner 9 has a number of gasket rings 12, in the present case four, such rings being for example in the form of O-rings or square-section rings for producing an air-tight joint sealing off the clearance between the hole 8 and the liner 9. The inner hole 11 of the liner 9, on the other hand, has a cylindrical form, it being shut off at 13, 41 at its end furthest from the driving side, hole 8 and inner hole 11 having a common axis. It is furthermore to be noted that the power, let-off and load openings 2, 4 and 3 are generally normal to the hole 8 in the housing and the inner hole 11 of the liner and are preferably offset somewhat in an axial direction so that, on scanning FIG. 1 downwards in an axial direction, it will be seen that opening 2 comes first, then opening 4 and, lastly, opening 3, liner 9 stretching further in an axial direction (that is to say, along the length L) than the part of the housing with the openings (having a length 1).

For the reasons which have been made clear, liner 9 has a top part or member 9a at its driving end next to driving rod 6, and a lower part or member 9b on the side of the top part 9a remote from the driving end. The top part and the lower part are coaxial to each other and are put together, the joint between them being completely smooth so that the outer face of the top and lower parts at the joint, is unbroken, in the form of a body of revolution.

Figure 2:
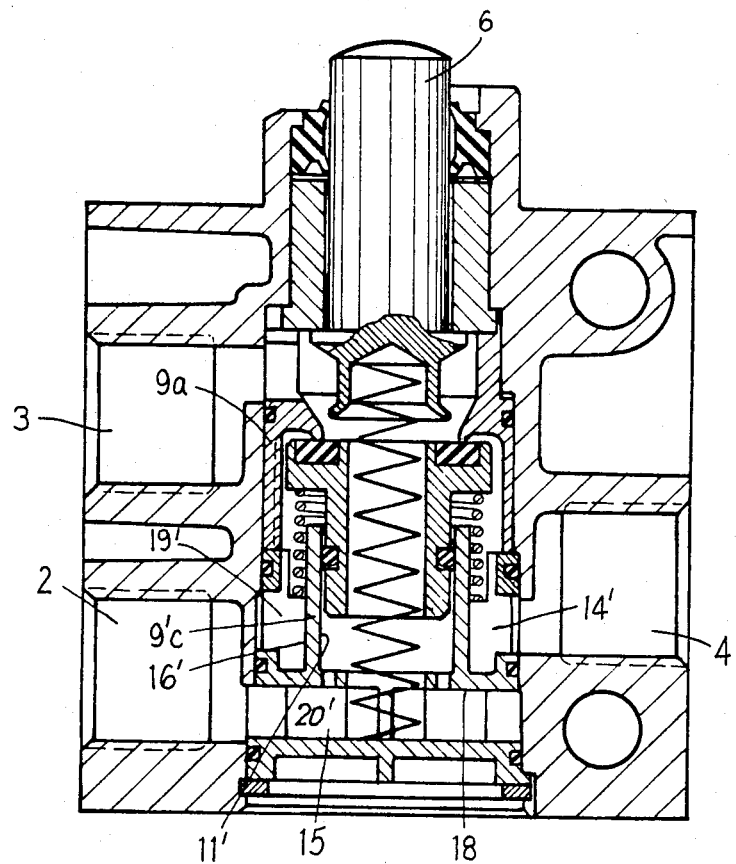
FIG. 2 is a somewhat changed form of the valve of FIG. 1, that is to say one in which the valve has been changed over to a normally open valve, the figure being a view similar to FIG. 1.

One may see from FIGS. 1 and 2 that for the purpose noted of changing possible forms of the valve and producing a greater range of different valve designs, one single top part 9a may be used with two different liner lower parts, that is to say 9b in the one case and 9'c in the other. Such lower parts 9b and 9'c have radial connection holes or passageways 14 in the one case and 15 in the other, stretching out from the middle hole 11, or 11'. In each of FIGS. 1 and 2, the valve is to be seen in the resting condition. When the valve of FIG. 2 is in its resting condition, connection hole 15 is responsible for making a connection between hole 11' and with the compressed air inlet opening 2. When the valve of FIG. 1 is in its resting condition, hole 14 makes the connection between hole 11 and the let-off opening connection 4. In FIG. 1, the liner lower part 9b has a cylindrical wall 16 stretching axially from a radial end wall 17, round the middle hole 11, to which it is coaxial, a ring-like space 19 being formed between wall 16 and the outer wall of the lower liner part 9b, such ring-like space 19 being open at its axial end on the driving side. In FIG. 2, the liner lower part 9'c has a cylindrical wall 16' stretching axially from a radial end wall 18 round the middle hole 11', to which it is coaxial, a ringlike space 19' being formed between wall 16' and the outer wall of the lower liner part 9'c, such ringlike space 19' being open at its axial end on the driving side. As noted earlier, the top part of the liner may be used with two different lower parts as may be desired, so that in the resting condition, in FIG. 1, the ring-like space 19 is joined up by a radial connection hole or passageway 20 (coming first in the axial direction) with the compressed air connection opening (the case of FIG. 1), and the middle inner hole 11 is joined up by a second radial connection hole 14 with the let off connection. In the other case (FIG. 2) the ring-like space 19' is joined up by the second radial connection hole 14' with the let-off opening and the middle inner hole 11' is joined by the first radial inner hole 20' with the compressed air inlet opening 2.

Running through the valve spool 5 from end to end, there is a middle, axial hole 22 which is coaxial with the inner hole 11 of the liner 9 and, at its end nearest to the driving rod, this valve spool 5 has radial collar 23 designed for use with the valve lip 10 and having, for this purpose, a seat ring 24 of rubber or other material with rubber-elastic properties, such ring being disposed in an annular groove in the end of the valve spool and fixed in position by vulcanization. In this respect, it is to be noted that valve spool 5 is biased by a compression spring 25, has its other end resting against liner 9 and has the effect of forcing spool 5 away from the lower, shut off end of the hole in the housing and towards the driving end of the liner; the spool has a gasket ring 26 for producing a seal between it and the liner, the gasket being for example in the form of an O-ring or square-section ring. The top part 9a of the liner 9 has the valve lip 10 which is formed on the liner 9 and takes the form of a part or flange running out from the wall of the liner placed round the inner hole so as to be stretching at a slope inwardly and towards the shut off end of the hole. The effect of the compression spring 25 is to keep the spool 5 resting against the valve lip 10 and away from the shut off end of hole 8.

For operation of spool 5, use is made of driving rod 6, such rod running out of the housing at its end furthest from the shut off end of the inner hole 11 of liner 9. Driving rod 6 is guided by a sleeve 30 fixed in the housing, a gasket and stripper ring 31 being kept in position by the sleeve 30 and the housing for gasketing the outer end of the guide hole for the driving rod and having two lips 32, 33, which are axially spaced and forced against the outer face of the driving rod, such lips furthermore running in opposite directions at a slope so that lip 33 has the effect of sealing and lip 32 that of stripping or wiping the outer face of the driving rod. On its side turned away from the lips, the ring 31 has an outwardly running positioning lip 34, kept in position between the outer end of the guide sleeve 30 and an inner collar 35 in the guide hole of the housing.

The valve spool 5 has a compression spring 40 running all the way through it, its one end resting against a radial part wall 13, 41 of the lower end 9b of the liner at the lower end of the inner hole, while the other end of the compression spring 40 is placed against the end face of rod 6 which is turned towards the inside of the housing, in which it is taken up in a small pocket 42 at this lower end of the driving rod 6, the lower edge of such pocket becoming wider in a downward direction as a bell-like ring or lip 43 with generally the same diameter as the inner diameter of the valve lip 10 of the liner to be used with the valve seat. The effect of the spring 40 is to keep the driving rod clear of the valve spool 5.

On looking at the system of FIG. 1 in the resting position ready for use, the reader will see that the load has an air let-off connection by way of hole 14, the middle hole 11 and the further hole 50, while the compressed air power line, joined up with opening 2, is shut off. If the driving rod 6 is moved, the seal ring 24 will be moved clear of the valve lip 10 while on the other hand the bell-like ring or lip 43 on driving rod 6 will come up against the seat ring 24 so that, in this case, the let-off connection is shut down and compressed air will be able to go from the compressed air inlet line by way of hole 20, the ring-like space 19, the space between the valve lip 10 and the valve spool 5 and by way of hole 50 to connection opening 3. In the system of FIG. 2, things are the other way round: In the resting position to be seen in the figure, the compressed air supply port 2 is joined up directly with the load port 3 by way of the hole 15, the middle hole of the spool 5 and, hole 50. Upon moving the driving rod, downwardly the load port 3 will be joined up by way of the hole 50, the ringlike space 19, and the hole 14' with the let off opening 4.

All inner parts of the valve may be slipped in from one end, that is to say from the side or end opposite to the driving end, such opposite end being shut off in the ready-for-use condition of the valve. The housing may, for example, be made of cast aluminum, while the liner may be made of resin and the valve spool of metal, this being true as well for the driving rod, which may have a hardened driving face.

The embodiments of the invention in which an exclusive property or privilege is claimed are defined as follows:

1. A valve, comprising a housing having means defining an elongate chamber therein and means defining first, second and third ports in said housing which are each in fluid communication with said chamber; sleevelike insert means which is disposed in said chamber and includes first and second axially offset insert members, said first insert member having means defining a valve seat thereon which faces generally in a first axial direction and having means for providing fluid communication between said first port and the region within said first insert member on the side of said valve seat remote from said second insert member; a closure member supported in said sleevelike insert means for axial movement between first and second positions, movement of said closure member from said first to said second position taking place in said first axial direction, said closure member having sealing surface means thereon which faces in a second axial direction generally opposite said first axial direction and which includes first and second surface portions, said first surface portion sealingly engaging said valve seat when said closure member is in said first position; first resilient means for yieldably urging said closure member toward said first position; a ram supported in said chamber for axial movement between third and fourth positions, movement of said ram from said third to said fourth position taking place in said first axial direction, said ram having a surface which faces generally in said first axial direction and which is spaced from said closure member when said ram is in said third position, said surface on said ram sealingly engaging said second surface portion on said closure member when said ram has moved from said third position to a fifth position which is located between said third and fourth positions, movement of said ram from said fifth position to said fourth position effecting movement of said closure member from said first to said second position against the urging of said first resilient means; second resilient means for yieldably urging said ram toward said third position; and means defining first and second passageways which each provide fluid communication between opposite sides of said closure member, fluid flow through said first passageway being obstructed when said first surface portion on said closure member is sealingly engaging said valve seat on said first insert member, and fluid flow through said second passageway being obstructed when said surface on said ram is sealingly engaging said second surface portion on said closure member; and wherein said second insert member includes means defining third and fourth passageways therein which respectively communicate with said first and second passageways and which each communicate with a respective one of said second and third ports.

2. The valve according to claim 1, wherein said first insert member has a radially inwardly extending annular flange thereon, said valve seat being annular and being provided on said annular flange; wherein said means defining said first passageway includes means defining an annular space encircling said closure member; wherein said means defining said second passageway includes means defining an axial opening through said closure member; and wherein said first and second surface portions on said closure member are annular and encircle said axial opening through said closure member.

3. The valve according to claim 2, wherein said second insert member includes concentric and radially spaced inner and outer annular walls, said closure member having a portion which is slidably disposed within and sealingly engages said inner annular wall, said axial opening through said closure member communicating with the region within said inner annular wall, the region between said inner and outer annular walls being a portion of said first passageway and the region within said inner annular wall being a portion of said second passageway; and wherein said third and fourth passageways respectively communicate with the region between said inner and outer annular walls and the region within said inner annular wall.

4. The valve according to claim 3, wherein said valve seat faces generally toward said second insert member, wherein said ram is located on the side of said valve seat and said closure member remote from said second insert member, wherein said closure member has a radially extending flange at an axial end thereof nearest said ram; wherein said first resilient means is a helical compression spring which encircles said closure member and said inner annular wall and which has one end supported on said second insert member and its other end supported on said flange on said closure member; and wherein said second resilient means is a helical compression spring which extends through said axial opening in said closure member and which has one end supported on said second insert member and its other end supported on said ram.

5. The valve according to claim 1, wherein said second insert member includes means defining a first chamber which is in fluid communication with said fourth passageway and means defining a second chamber which is annular, which encircles said first chamber, and which is in fluid communication with said third passageway; and wherein said third and fourth passageways each extend generally radially.

6. The valve according to claim 5, wherein said second insert member has a radially extending end wall, an outer annular wall which extends toward said first insert member from said end wall, and an inner annular wall which is radially spaced from and concentrically positioned within said outer annular wall and which extends axially toward said first insert member from said end wall, the region within said inner annular wall being said first chamber and the region between said inner and outer annular walls being said second chamber.

7. The valve according to claim 1, wherein said housing has means defining an elongate opening which extends into said housing from an exterior surface thereof, said elongate chamber being a portion of said elongate opening in said housing and said second insert member having means for closing the end of said opening in said housing which is adjacent said exterior surface.

8. The valve according to claim 7, wherein said ram, said first insert member, said closure member, said first resilient means and said second resilient means, during assembly of said valve, are inserted into said elongate opening in said housing through said end thereof before said second insert member is inserted into said end of said elongate opening in said housing to close it.

9. The valve according to claim 1, wherein said first, second and third ports in said housing each extend generally normal to said first direction and are axially spaced with respect to each other.

10. The valve according to claim 1, including means defining an opening through said housing which extends substantially in said first direction and communicates with said chamber at an end thereof nearest said ram; including an annular guide sleeve and an annular seal provided in said opening; and wherein said ram has an elongate extension thereon which extends through said guide sleeve and said annular seal to a location outside said housing, said annular seal having two axially spaced annular lips thereon which are inclined to extend radially inwardly and axially away from each other and which each slidably engage said extension on said ram.

* * * * *